United States Patent
Miller et al.

(10) Patent No.: US 7,540,465 B1
(45) Date of Patent: Jun. 2, 2009

(54) SHOCK ABSORBING MOTOR MOUNT FOR VIBRATORY BELT DRIVE

(76) Inventors: Charles A. Miller, 11176 41st. Ct. N., Royal Palm Beach, FL (US) 33411; Roger L. Miller, 11176 41st Ct. N., Royal Palm Beach, FL (US) 33411

( * ) Notice: Subject to any disclaimer, the term of this patent is extended or adjusted under 35 U.S.C. 154(b) by 466 days.

(21) Appl. No.: 11/243,145

(22) Filed: Oct. 4, 2005

Related U.S. Application Data

(63) Continuation-in-part of application No. 10/092,823, filed on Mar. 8, 2002, now abandoned.

(51) Int. Cl.
F16M 13/00 (2006.01)
F16H 7/14 (2006.01)

(52) U.S. Cl. .......... 248/619; 248/596; 248/665; 474/114

(58) Field of Classification Search .......... 248/596, 248/619, 678, 664, 665, 666, 592, 594, 595, 248/598, 618, 620; 474/114, 115, 117
See application file for complete search history.

(56) References Cited

U.S. PATENT DOCUMENTS

| | | | |
|---|---|---|---|
| 151,994 A | 6/1874 | Matthews | |
| 766,891 A | 8/1904 | Newbold | |
| 1,338,555 A | 4/1920 | Cook | |
| 1,398,831 A | 11/1921 | Bliss | |
| 1,433,553 A * | 10/1922 | Kimble | 188/171 |
| 1,455,345 A | 5/1923 | Maimin | |
| 1,540,720 A | 6/1925 | Buckbee | |
| 1,694,868 A | 12/1928 | Sawyer | |
| 1,960,506 A | 5/1934 | Pfleger | |
| 2,202,413 A * | 5/1940 | Anderson et al. | 248/619 |
| 2,360,428 A * | 10/1944 | Larsen et al. | 248/596 |
| 2,818,911 A | 1/1958 | Syak | |
| 3,369,840 A | 2/1968 | Dufton | |
| 4,372,180 A | 2/1983 | Bollinger | |
| 4,865,289 A * | 9/1989 | Lawson | 248/666 |
| 5,233,818 A | 8/1993 | Dettbarn | |
| 5,277,665 A * | 1/1994 | Paulson | 474/114 |
| 6,237,749 B1 | 5/2001 | Musschoot | |

OTHER PUBLICATIONS

Deister Corp. DWG. No. 08300 Aug. 12, 1991.
Deister Corp. DWG. No. 128549 Aug. 1, 1996.

* cited by examiner

*Primary Examiner*—Amy J Sterling
*Assistant Examiner*—Tan Le
(74) *Attorney, Agent, or Firm*—Alvin S. Blum

(57) ABSTRACT

A motor mount for a motor that drives an endless belt for a vibratory apparatus has a platform on which the motor is attached. The platform is supported on a base by a pivoting connection so that the platform rotates about an axis that is parallel to the motor shaft. Spring tension is applied to the belt drive by a leaf spring bias between the platform and the base at a distance from the pivotal connection.

2 Claims, 2 Drawing Sheets

SHOCK ABSORBING MOTOR MOUNT FOR VIBRATORY BELT DRIVE

CROSS REFERENCE TO RELATED APPLICATION

This application is a continuation-in-part of patent application Ser. No. 10/092,823 filed Mar. 8, 2002 now abandoned, the entire contents of which are incorporated herein by this reference.

TECHNICAL FIELD OF THE INVENTION

This invention relates to pivoting motor mounts, and more particularly to those provided with spring bias for tensioning drive belts or bands that operate vibratory apparatus.

BACKGROUND OF THE INVENTION

Heavy duty apparatus such as vibratory conveyor belts, chain hoists, and the like that have an intermittent load are often driven by power bands or drive belts from an electric motor. Tension on the band is maintained by supporting the motor on a pivoting motor mount. A platform holds the motor. An elongate sleeve affixed to the underside of the platform pivots on a stationary axle that is mounted on a fixed base. A non-cylindrical resilient member between the sleeve and the axle provides spring bias. In another type of mount, spring bias is provided by a compression spring between a pivoting axle and the base. The band slips when excessive load is applied, such as at start up. This causes excessive band wear, leading to band failure. In many cases, the operating cost of band failure is many times greater than the cost of a new band, since maintenance personnel may not be at hand. The entire operation may be stopped for days.

SUMMARY OF THE INVENTION

In accordance with the invention, an improved spring tension pivoting motor mount is described that will prevent premature failure of power bands.

It is another object that the invention be readily adapted to retrofit existing motor mounts.

It is yet another object that the invention facilitate the replacement of power bands, when necessary.

A motor mount for a motor that drives an endless belt for a vibratory apparatus has a platform on which the motor is attached. The platform is supported on a base by a pivoting connection so that the platform rotates about an axis that is parallel to the motor shaft. Spring tension is applied to the belt drive by a leaf spring bias between the platform and the base at a distance from the pivotal connection.

These and other objects, features, and advantages of the invention will become more apparent from the detailed description of an exemplary embodiment thereof as illustrated in the accompanying drawings, in which like elements are designated by like reference characters in the various drawing figures.

DETAILED DESCRIPTION OF PREFERRED EMBODIMENTS

Figure 1:
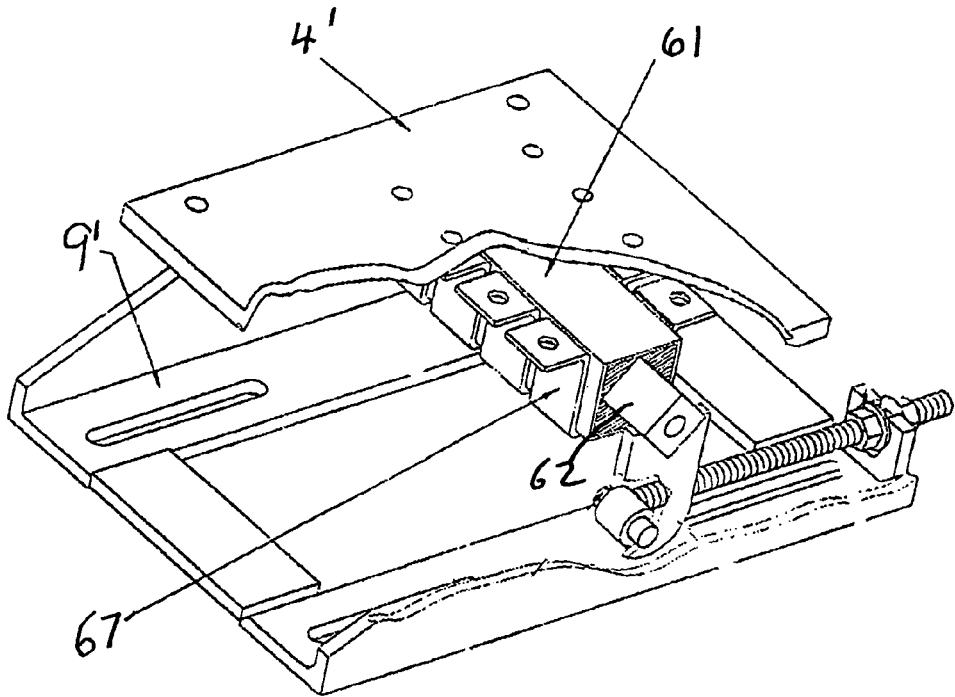
FIG. 1 is a diagrammatic representation of a motor mount of the prior art.

Referring now to FIG. 1, a pivoting motor mount in common use has a platform 4' upon which an electric motor is mounted. The platform is supported on a base 9' by a non-round bar 62 attached to the base. A rubber sleeve 61 is attached to the platform by clamps 67. When the motor is used to drive an endless belt that produces vibration, such as a conveyor belt in a cement plant, the platform can pivot to a limited extent with spring bias provided by the rubber sleeve. This provides sufficient tension to the belt to prevent belt slipping during continuous operation. However, during start up, the belt may slip enough to shorten the life of the belt considerably. This is costly to operations.

Figure 2:
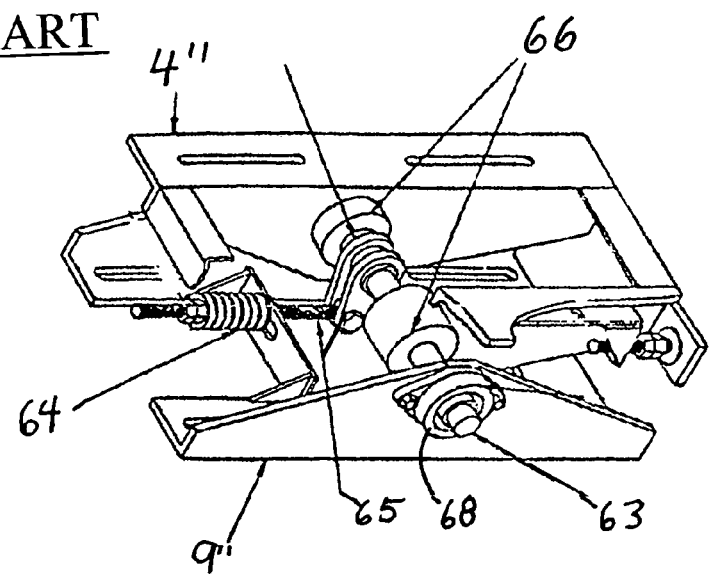
FIG. 2 is a diagrammatic representation of another motor mount of the prior art.

FIG. 2 illustrates another pivoting motor mount of the prior art. The platform 4" is affixed to axle 63 by sleeve blocks 66. Axle 63 is rotatably supported on base 9" by bearings 68. Torque arm 65 affixed to the axle cooperates with spring 64 to provide spring bias against platform rotation. Applicants have found that this structure suffers from the same deficiencies as that of FIG. 1.

Figure 3:
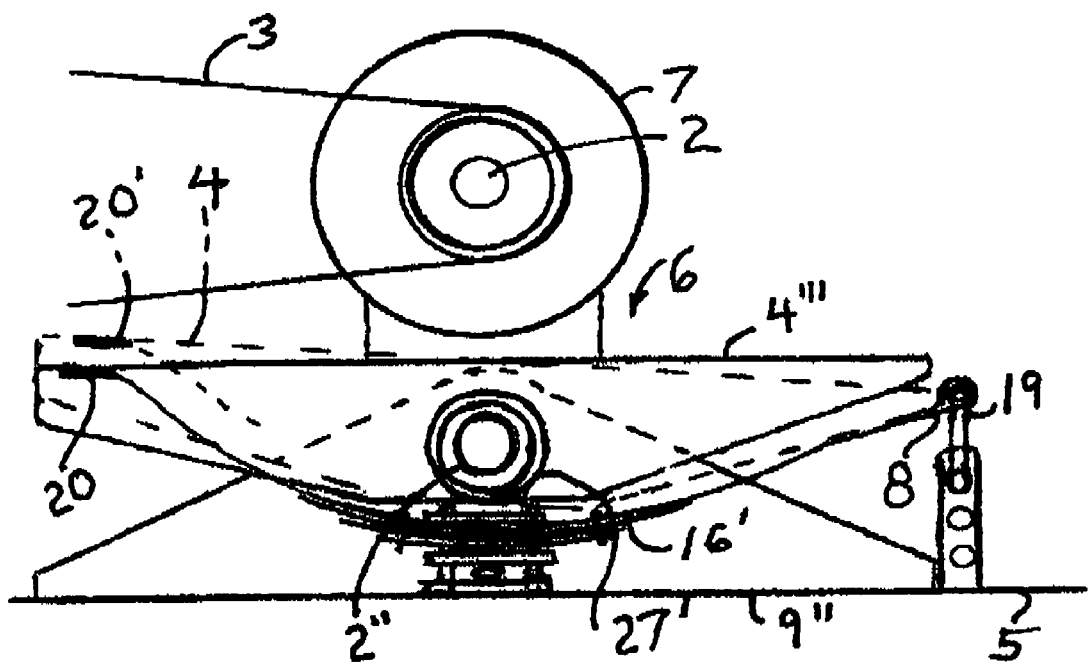
FIG. 3 is a diagrammatic representation of a motor mount of the invention.

Referring now to FIG. 3, a pivoting motor mount of the invention is shown for mounting an electric motor 7 on a support 5. The electric motor has a shaft 2 that drives an endless belt 3. The motor mount comprises:

a) a pivoting platform 4''' adapted for attaching the motor thereto;

b) a base 9" for mounting on the support;

c) pivotal connecting means 2" and 27' between the base and the platform for pivoting the platform about an axis parallel to the shaft;

d) leaf spring means 16' interposed between the platform and the base for applying spring bias therebetween away from the pivotal connecting means to springably resist the pull of the belt on the motor, thereby applying tension to the belt; and e) in which the leaf spring means has a first end 8 connected to the base and a second end 20 slidingly engaging the platform.

The spring bias is provided by a leaf spring 16', of arcuate configuration, attached to the base 9" by a shackle 19. The free end 20 of the spring, as shown, slidingly engages the platform 4''' to springably resist rotation of the axle 2" fixed to the platform about the bearing 27' affixed to the base. The belt tension tends to rotate the platform counterclockwise. This forces the platform down against end 20 of the spring, tending to flatten its arc. The springy nature of spring 16' causes it to resist this force by an upward counterforce that forces the platform clockwise, thereby increasing tension on the belt.

To clarify the spring action, the platform is shown in phantom as 4 in the position it would be forced into by leaf spring end 20' also shown in phantom prior to the belt being put on the motor that tends to straighten the natural arc of the spring. This action is well known in the art of automotive leaf springs. It thereby applies tension to the belt.

While we have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A pivoting motor mount for mounting on a support an electric motor having a shaft that drives an endless belt, the motor mount comprising:
 a) a pivoting platform adapted for attaching the motor thereto;
 b) a base for mounting on the support;
 c) pivotal connecting means between the base and the platform for pivoting the platform about an axis parallel to the shaft; and
 d) leaf spring means interposed between the platform and the base for applying spring bias force to the platform upward from the base at a location away from the pivotal connecting means to springably resist the pull of the belt on the motor, thereby applying tension to the belt; and in which the leaf spring means has a first end attached to the base and a second end slidingly engaging the platform.

2. A pivoting motor mount for mounting on a support an electric motor having a shaft that drives an endless belt, the motor mount comprising:
 a) a pivoting platform adapted for attaching the motor thereto;
 b) a base for mounting on the support;
 c) pivotal connecting means between the base and the platform for pivoting the platform about an axis parallel to the shaft;
 d) leaf spring means interposed between the platform and the base for applying spring bias force to the platform upward from the base at a location away from the pivotal connecting means to springably resist the pull of the belt on the motor, thereby applying tension to the belt; and
 e) in which the leaf spring means has a first end attached to the base and a second end slidingly engaging the platform and applying the upward force.

* * * * *